(12) United States Patent
Beard et al.

(10) Patent No.: US 10,315,715 B2
(45) Date of Patent: Jun. 11, 2019

(54) MOBILE, CLIMBING ENDLESS TRACK ROBOTIC SYSTEM TO PERFORM REMOTE INSPECTIONS ON STRUCTURES

(76) Inventors: James Beard, Cookeville, TN (US); Stephen Canfield, Cookeville, TN (US); Steve Glovsky, Franklin, TN (US)

(*) Notice: Subject to any disclaimer, the term of this patent is extended or adjusted under 35 U.S.C. 154(b) by 1021 days.

(21) Appl. No.: 13/291,876

(22) Filed: Nov. 8, 2011

(65) Prior Publication Data

US 2012/0116583 A1    May 10, 2012

Related U.S. Application Data

(60) Provisional application No. 61/456,415, filed on Nov. 8, 2010.

(51) Int. Cl.
| | | |
|---|---|---|
| *B62D 55/265* | (2006.01) |
| *B62D 55/30* | (2006.01) |
| *B62D 55/108* | (2006.01) |
| *B62D 55/20* | (2006.01) |

(52) U.S. Cl.
CPC ......... *B62D 55/265* (2013.01); *B62D 55/108* (2013.01); *B62D 55/202* (2013.01); *B62D 55/305* (2013.01)

(58) Field of Classification Search
CPC ...... B62D 55/265; B62D 55/30; B62D 55/02; B63B 59/10; Y10S 180/901
USPC ............. 180/9.32, 9.34, 9.4, 9.42, 164, 901; 901/1, 44, 46
See application file for complete search history.

(56) References Cited

U.S. PATENT DOCUMENTS

| | | | | |
|---|---|---|---|---|
| 3,960,229 A | * | 6/1976 | Shio | 180/9.62 |
| 4,828,059 A | * | 5/1989 | Naito et al. | 180/119 |
| 5,205,174 A | * | 4/1993 | Silverman et al. | 73/623 |
| 5,366,038 A | * | 11/1994 | Hidetsugu et al. | 180/164 |
| 5,435,405 A | * | 7/1995 | Schempf et al. | 180/9.1 |
| 5,633,707 A | * | 5/1997 | Seemann | 356/35.5 |
| 8,225,892 B2 | * | 7/2012 | Ben-Tzvi | 180/9.1 |
| 8,393,421 B2 | * | 3/2013 | Kornstein et al. | 180/9.1 |
| 2007/0209844 A1 | * | 9/2007 | Kamimura | 180/9.32 |

FOREIGN PATENT DOCUMENTS

| | | | |
|---|---|---|---|
| EP | 2708454 | * | 9/2012 |
| FR | 2310256 | * | 12/1976 |
| GB | 1545232 | * | 5/1979 |
| WO | 2007025553 | * | 3/2007 |

* cited by examiner

*Primary Examiner* — Anne Marie M Boehler (57) ABSTRACT

An endless-track type mobile climbing vehicle containing a suspension apparatus, transducer manipulator and surface cleaning system to perform non-destructive examination of structures while traversing the structure in all positions. The invention is able to conform to large range of irregularities of the climbing surface while maintaining contact between the track and adhering members and uniformly distributing the climbing loads on the adhering members giving the system a high payload to weight ratio. The invention is moves the inspection transducer over the surface while maintaining correct alignment of the tool relative to the surface. The invention allows an operator to perform an inspection on structures that require cleaning or other preparation prior to inspection. The invention allows an operator to perform an inspection remotely.

13 Claims, 13 Drawing Sheets

MOBILE, CLIMBING ENDLESS TRACK ROBOTIC SYSTEM TO PERFORM REMOTE INSPECTIONS ON STRUCTURES

CROSS REFERENCE TO RELATED APPLICATIONS

This application claims the priority of U.S. Provisional Application Ser. No. 61/456,415 entitled "Mobile, climbing robotic system to perform remote inspections on ferrous structures" filed on Nov. 8, 2010, the entire contents and substance of which are hereby incorporated in total by reference.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

Ferrous metal structures are commonplace in many industrial settings such as power producing plants, windmills, factories or shipyards, storage structures, buildings and bridges. These structures are often irregular and will be described as unstructured environments. Depending on the nature of the structure, periodic inspection and maintenance is required, often through standard maintenance practices. In many instances, regular inspections of these structures are required by regulatory agencies such as EPA, for example if the structure is used to hold a chemical liquid. In order to perform the examination, manual inspection is generally performed using tools consisting of a nondestructive examination technology such as ultrasonic inspection. Nondestructive examination tools place requirements on the overall inspection process, such as a certain level of surface preparation, applying liquids on the surface, placing the nondestructive examination tool transducer at a specific position and orientation relative to the surface, and manipulation of the transducer based on feedback from the nondestructive examination tool output.

Because of these requirements, inspection using nondestructive examination tools is usually done manually by a trained technician. In unstructured environments, this requires the technician to be placed directly in the proximity of any location to be inspected. This potentially poses a safety hazard to the human operator. It also increases the cost of such inspection due to the need for the trained operator, safety and support systems.

The use of a mobile-platform, climbing vehicle capable of navigating part or all of a structure while carrying and manipulating inspection equipment represents a method to make the inspection process safer, cheaper and more reliable. A number of mobile climbing systems designed for inspection or related activities are demonstrated in the prior art. The prior art of climbing vehicles inspection tasks typically generate adhering forces through one of two methods, magnetic forces or vacuum (pressure) forces. The means to integrate these into a moving platform are more diverse with the general methods summarized here.

Wheeled or endless track devices making use of vacuum pressure include the following. U.S. Pat. Nos. 7,520,356 and 7,076,335 show vehicles that use wheels or endless tracks with the vacuum seal devices attached to the frame of the vehicle and slide over the climbing surface. U.S. Pat. No. 7,520,356 includes the ability to connect these vehicles in a modular fashion with the ability to transition between wall surfaces. US patent application no. US 2005/0072612 A1 shows a combination of wheel and endless-track drive that simultaneously provides driving forces and a perimeter seal for suction adhering to vertical surfaces.

There are also examples of legged-type vehicles making use of vacuum pressure, for example, U.S. Pat. No. 5,551,525 demonstrates a legged-type climbing robot with vacuum cups for adhering members.

Wheeled or endless track devices that make use of magnetic forces include the following. U.S. Pat. Nos. 3,764,777, 5,853,655, 6,627,004, 5,809,099 and Fisher, Tache and Siegwart (2008) show variations of climbing vehicles with magnetic wheels whose axes are fixed to the vehicle chassis. U.S. Pat. No. 7,309,464 shows a magnetic wheel carriage with wheel axes supported on the vehicle frame but given an additional degree of freedom such that the magnetic wheels are steerable.

US Patent application publication US 2010/0176106 A1 shows a magnetic wheel carriage with magnetic wheels that rotate about axes that are able to change orientation relative to the vehicle frame. The additional mobility in the wheel axes allows a larger number of wheels to make contact with a climbing surface when operating on non-flat or non-uniform climbing surfaces.

U.S. Pat. No. 5,435,405 shows an example of a type of climbing carriage or vehicle that contains magnets or similar adhering members attached to endless tracks, with multiple magnets attaching to the climbing surface at any given time. However, these systems tend to either place the magnets on a track without a track guide or mechanism between the end wheels (for example U.S. Pat. No. 5,884,642 or Shen and Shen, 2005) and rely on tension in the track to transfer climbing forces to the adhering members, or on a track with a rigid track guide limiting the ability to conform to a non-uniform climbing surfaces (for example U.S. Pat. No. 5,487,440, Kim et al., 2008) or a guide that has some flexibility but for purposes of pushing in a single direction on the track to make contact with the climbing surface (for example U.S. Pat. No. 4,789,037). When climbing the loads required to maintain equilibrium are transferred to the adhering members according to the relative compliance of the carriage frame and endless track system and in general will be localized to a small number of the adhering members causing degradation in holding power.

The existing prior art demonstrates differing technical approaches for climbing or traversing inclined or inverted surfaces while carrying and positioning a payload such as an inspection transducer. To be robust, the systems must be able to accommodate variations or irregularities in the climbing surface, and maintain an optimal use of the adhering forces required to adhere and maintain equilibrium on the climbing surface and to have a large payload to weight ratio. The payload will include the inspection transducer and in many cases tooling to clean or otherwise prepare the surface for inspection. In this regard, the technology demonstrated in the prior art suffers from a few distinct drawbacks which are discussed here.

The systems that employ magnetic wheels with axes rigidly attached to the vehicle chassis, or that attach magnets directly to the vehicle chassis lack the ability to accommodate variations in the climbing surface, and will lose adhering force and traction when traveling over surfaces that have a certain degree of geometric irregularity. The vehicle systems that use magnetic wheels on moving axes do not demonstrate a means to distribute climbing loads among the wheels and therefore can cause the adhering forces to be localized in one or a few of the magnetic wheels. The systems that employ endless tracks with magnets or other adhering members attached, and the endless track passing through a rigid guide attached to the vehicle frame lack the ability to accommodate variations in the climbing surface, and will lose adhering force and traction when traveling over surfaces that have a certain degree of geometric irregularity. The systems that employ endless tracks with magnets or other adhering members attached, and the endless track is not connected to the vehicle frame through some type of guide will cause the adhering forces to be localized to the exterior magnets on the contact portion of the endless track. Systems that employ endless-tracks also can cause undesirable motions in the inspection transducer that can reduce the efficiency of inspection. Systems that employ vacuum pressure forces for adhering rely on compliant or flexible portions of the vacuum cup (U.S. Pat. Nos. 7,520,356 and 7,076,335) or compliant surface of the endless track itself (US 2005/0072612 A1) to accommodate surface irregularities and enforce the perimeter seal required to maintain the vacuum forces However, the degree of surface irregularity permitted is limited by the availability and durability of the compliant materials.

There are two methods demonstrated in the prior art that attempt to simultaneously accommodate surface forces and distribute climbing forces. Xu and Ma (2002) shows an endless-track type climbing vehicle with type of climbing vehicle with magnets called magnetic suckers. A load distribution mechanism is presented as a three link member connected to the vehicle body with a single spring. The article does not show how the endless track would connect with the load scatter mechanism or how forces are transferred from the track to the mechanism. Further, as presented, the load scatter mechanism localizes moment-balance forces to the leading portion of the load scatter mechanism and similarly the leading edge of the endless track. Canfield and Beard (US Patent application 2010) show a compliant-beam suspension mechanism for an endless track type climbing vehicle that relies on elastic compliance of a beam to match surface irregularities and distribute loads. In practice, engineering materials are not readily available that can accommodate large strains required by this for surfaces with significant variation.

BRIEF SUMMARY OF THE INVENTION

The invention described in this document creates a climbing endless track type inspection vehicle capable of climbing inverted positions, even upside down, while carrying and manipulating nondestructive examination tools. This invention allows an inspection operator to perform an inspection in a remote fashion in a variety of positions including flat surfaces, inverted surfaces, both horizontal and vertical and upside-down. The invention allows an inspection operator to supervise and control the inspection process through a hand-held controller. The invention allows the inspection operator to specify the type of inspection and manipulation parameters for five axes: three translations of the inspection transducer and two rotations of the inspection transducer (about the axes orthogonal to the transducer axis).

The primary contribution of the invention is that it addresses the main technical challenges in creating a mobile climbing inspection system that can accommodate irregularities in the climbing surface, can distribute the climbing forces over the adhering members in an optimal fashion, and can limit parasitic motions in the inspection transducer. This invention applies to endless track-type climbing vehicles with adhering members connected to the exterior portion of the endless track. This method permits a large area of contact for the adhering members with the climbing surface. This invention addresses the drawbacks in the existing prior art through the following:

1) The Inspection vehicle of this invention integrates a multi-link suspension apparatus that distributes climbing loads to maximize the system payload to weight ratio.
2) The welding platform of this invention integrates a multi-link I suspension apparatus that is adaptive to irregularities in the climbing surface.
3) The invention system contains a transducer manipulator that is independently suspended from the vehicle. Thus it isolates undesirable motions in the vehicle from the transducer. This lowers the control requirements on the climbing vehicle,
4) The invention integrates the transducer manipulator and vehicle platform in a reconfigurable and modular arrangement to position the transducer anywhere inside, outside or around the platform, to achieve a large range of reach in inspection tasks.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
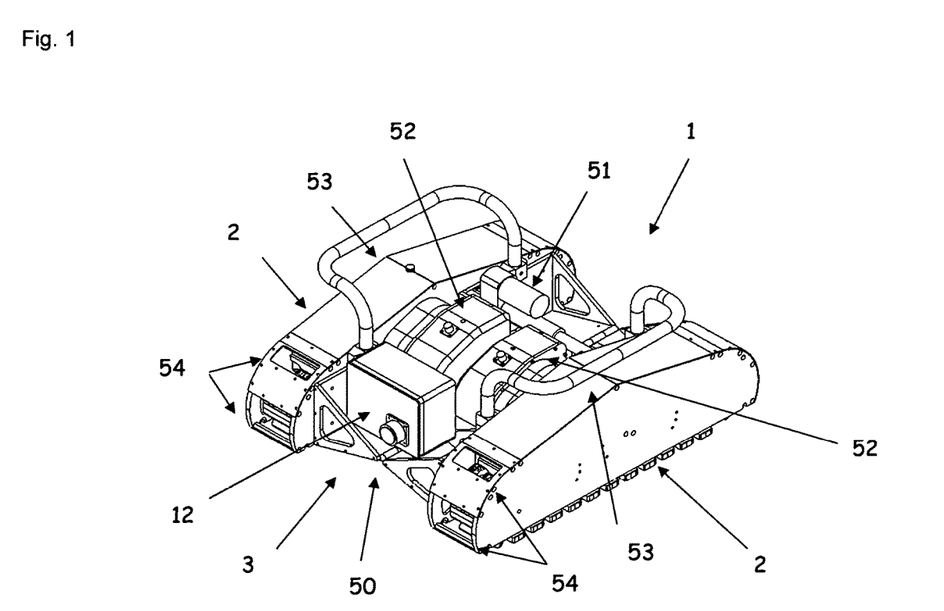
FIG. 1 shows an isometric view of the climbing endless track inspection vehicle that includes two endless track units and multi degree of freedom chassis.

In FIG. 1, the climbing endless track vehicle (1) which comprises of one or more track units (2) connected to a chassis (3). The chassis can be a rigid member or have one or more active or passive degrees of freedom to allow some degree of relative mobility between the track units (2) to permit greater adaptation to various climbing surfaces. The chassis (3) shows a rotational degree of freedom along the longitudinal axis between the track units through the hinge (50) and actuator (51). When the chassis contains one or more degrees of freedom, inspection and surface cleaning tooling can be mounted to one of the track units (2) or to one of the interior chassis members. In the embodiment shown, the track units (2) have externally mounted track unit drives (52) which may include actuator, encoder, transmission and brake. Ports are provided for access to the adhering members on the track through doors (53) as well as locations (54) to mount brushes or active devices for cleaning the surface of the adhering members during operation (cleaning devices not shown).

Figure 2:
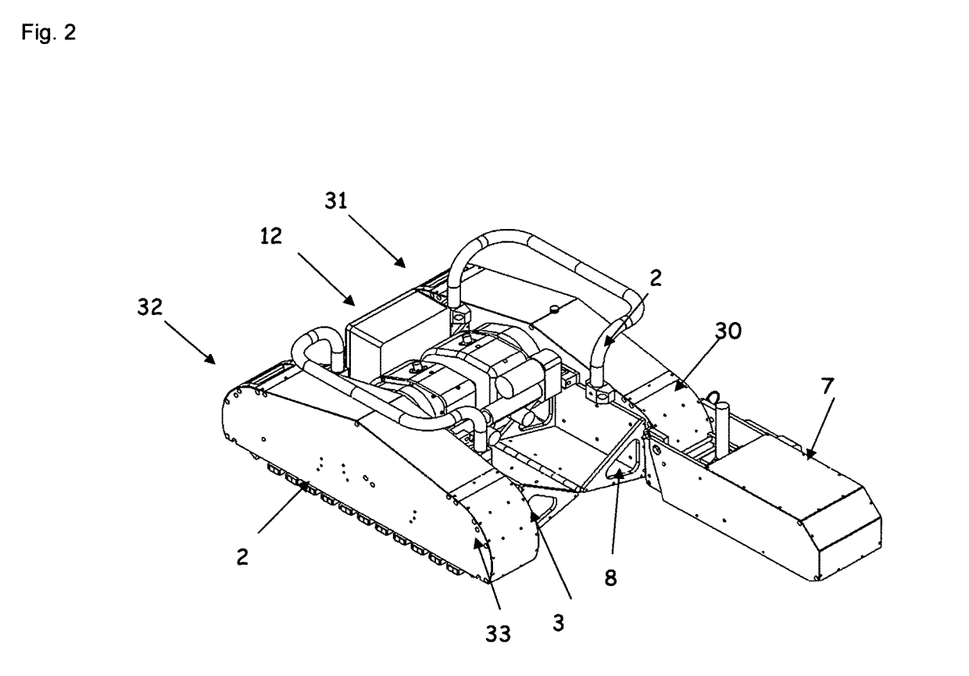
FIG. 2 shows an isometric view of the climbing endless track inspection vehicle that includes two endless track units and multi degree of freedom chassis with an inspection transducer carriage.

In FIG. 2, the climbing endless track vehicle with the inspection transducer carriage (7) with universal attachment (8) is shown. The inspection transducer carriage can be mounted at any of the mounting locations (30), (31), on one track unit and (32), (33) on a second track unit for an endless track vehicle with two track units (2).

Figure 3:
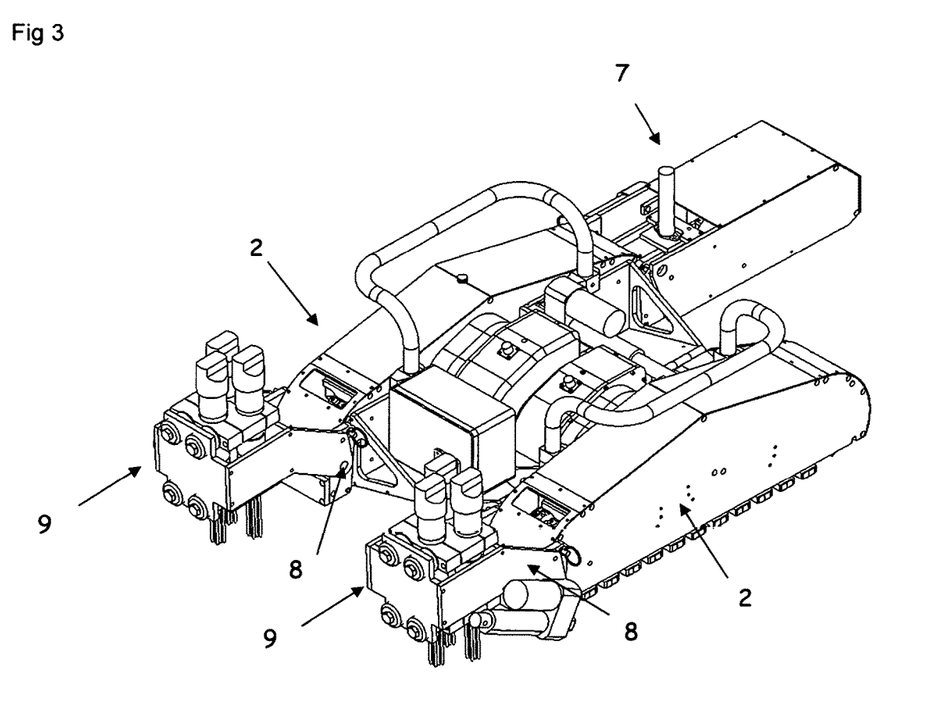
FIG. 3 shows an isometric view of the climbing endless track inspection vehicle that includes two endless track units and multi degree of freedom chassis with an inspection transducer carriage and two surface cleaning manipulators attached.

In FIG. 3, the climbing endless track vehicle is shown with one inspection transducer carriage (7) attached at one mounting location and two surface cleaning manipulators (9) attached at two other mounting locations. The surface cleaning manipulators (9) are attached to the track unit (2) using the universal attachment (8).

Figure 4:
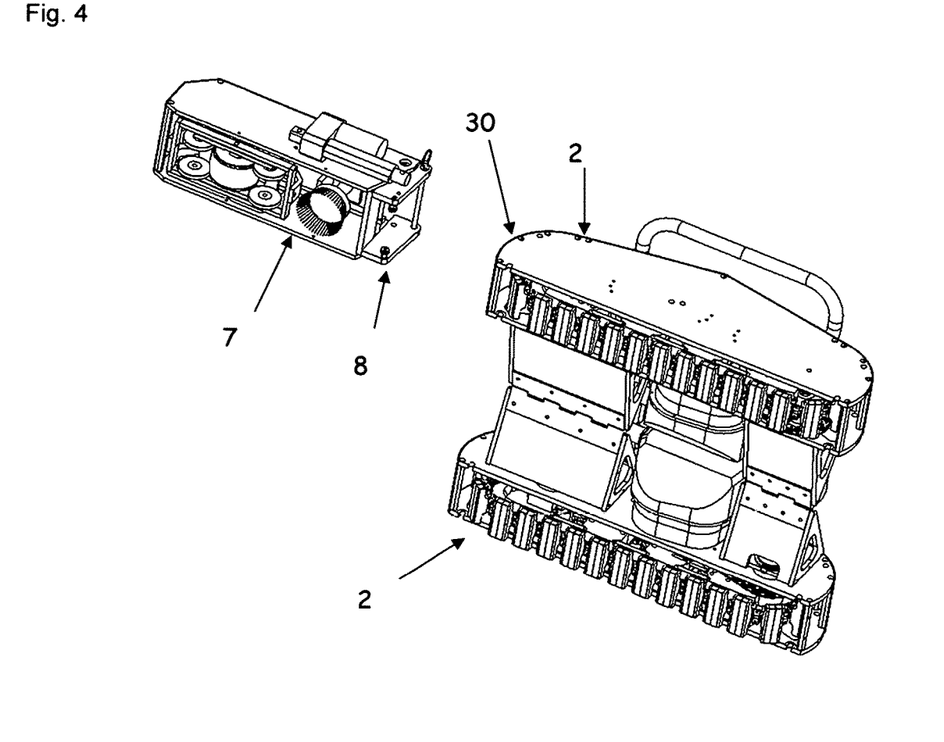
FIG. 4 shows an overview of the universal connection between the inspection transducer carriage and the track unit.

FIG. 4 shows more detail on the universal attachment (8) for an inspection transducer (7) and a track unit (2) as it may connect to one of the mounting locations (30) on the track unit (2).

Figure 5:
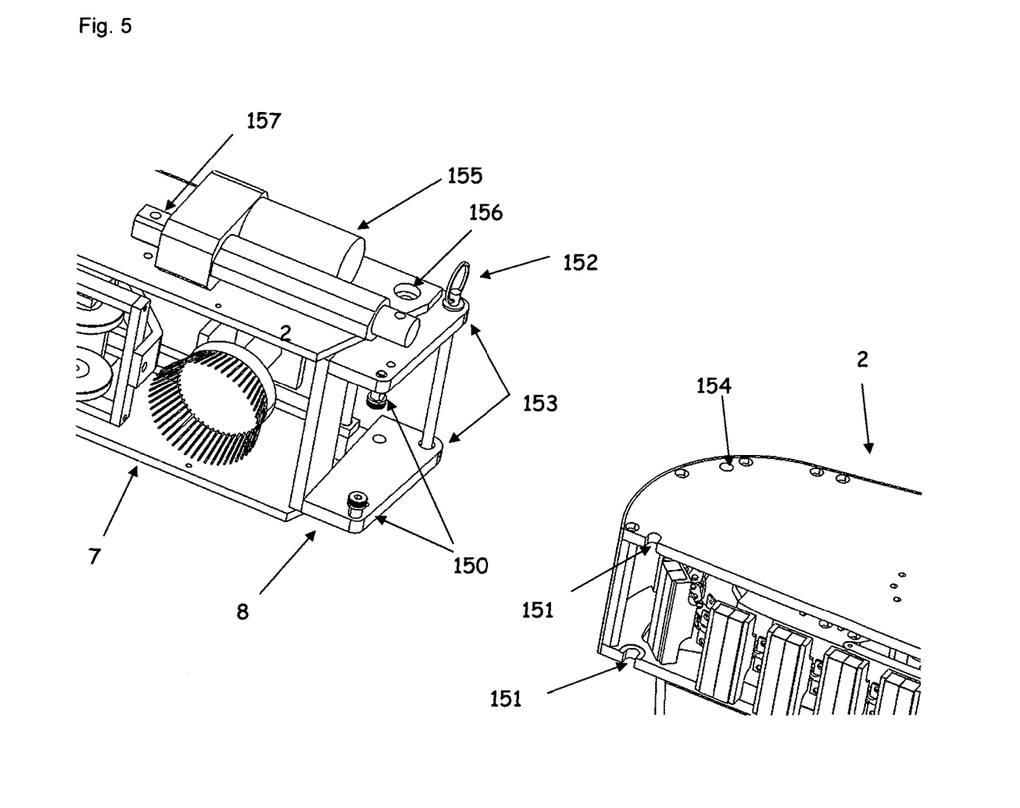
FIG. 5 shows a close up view of the universal connection between the inspection transducer carriage and the track unit.

FIG. 5 shows a close up view of the universal attachment (8) for an inspection transducer carriage (7) and a track unit (2) as it may connect to one of the mounting locations (30) on the track unit (2). The connection consists of two lower pins (150) on the universal attachment (8) that can be inserted into mating slots (151) on the track unit. A removable pin (152) passes through an aligned set of holes (153) on the universal attachment (8) and an aligned hole on the track unit (154). The pins (150), slots (151), removable pin (152), and aligned holes (154) are uniform in spacing to allow connection and disconnect. The uniform set of slots (151) and aligned holes (154) are found on all of the mounting locations on all track units (2). An actuator (155) provides a final connection between the inspection transducer carriage (7) through revolute joints (156), and revolute (157) to the universal attachment and can place the inspection transducer carriage on the surface or lift as desired.

Figure 6:
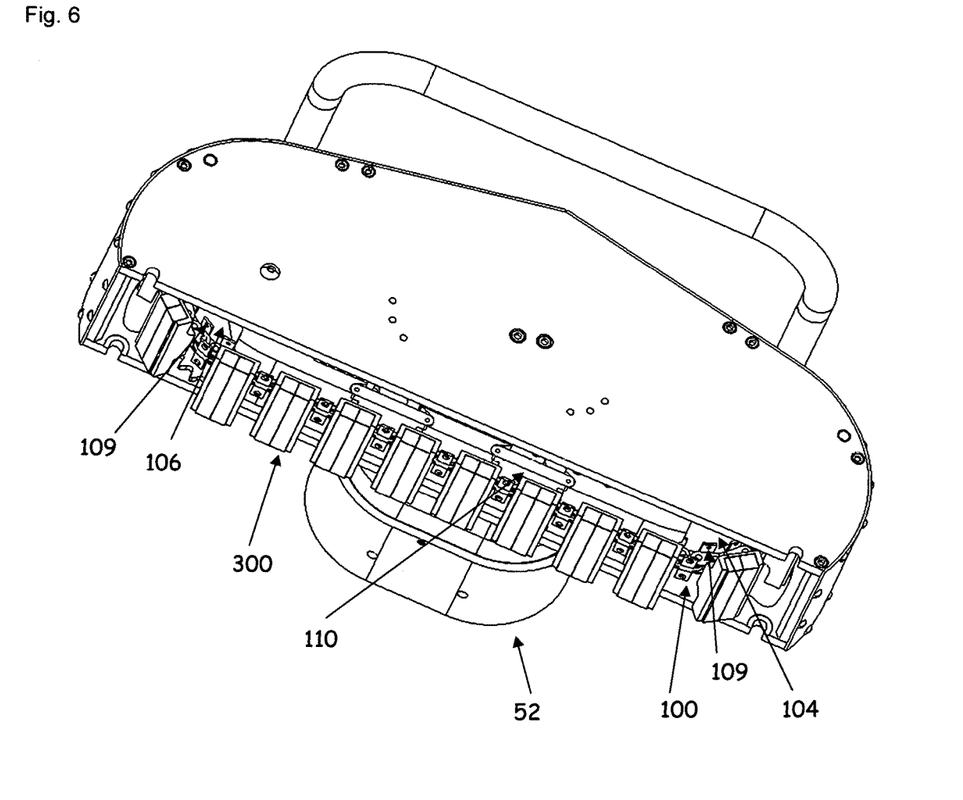
FIG. 6 shows a single endless track unit.

The track units are geometrically similar and symmetric; one is shown in FIG. 6. The endless track unit consists of an endless track (100) with a collection of permanent magnet feet (300) attached to the track. The endless track (100) passes around a drive sprocket (104) and track sprocket (106) and contains protrusions (109) that pass through the multi-link suspension apparatus (110). The protrusions also called_rollers or flanges. A drive unit (52) drives the drive sprocket (104) and or track sprocket (106)

Figure 7:
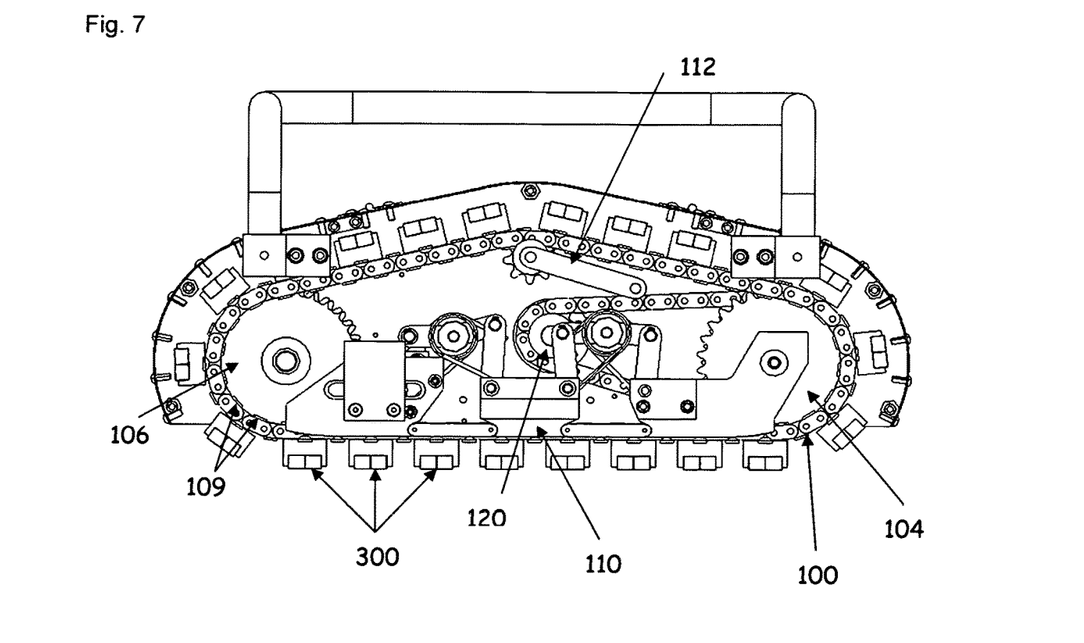
FIG. 7 shows a single endless track unit with the internal components exposed.

FIG. 7 shows the internal components in the track unit. The track drive sprocket (104) is pivotally attached to the mobile platform chassis and connected through a drive chain to the transmission drive sprocket (120). The endless track (100) travels around the drive sprocket (104) and track sprocket (106), through the multi-link suspension apparatus (110) and engages the track tension mechanism (112).

Figure 8:
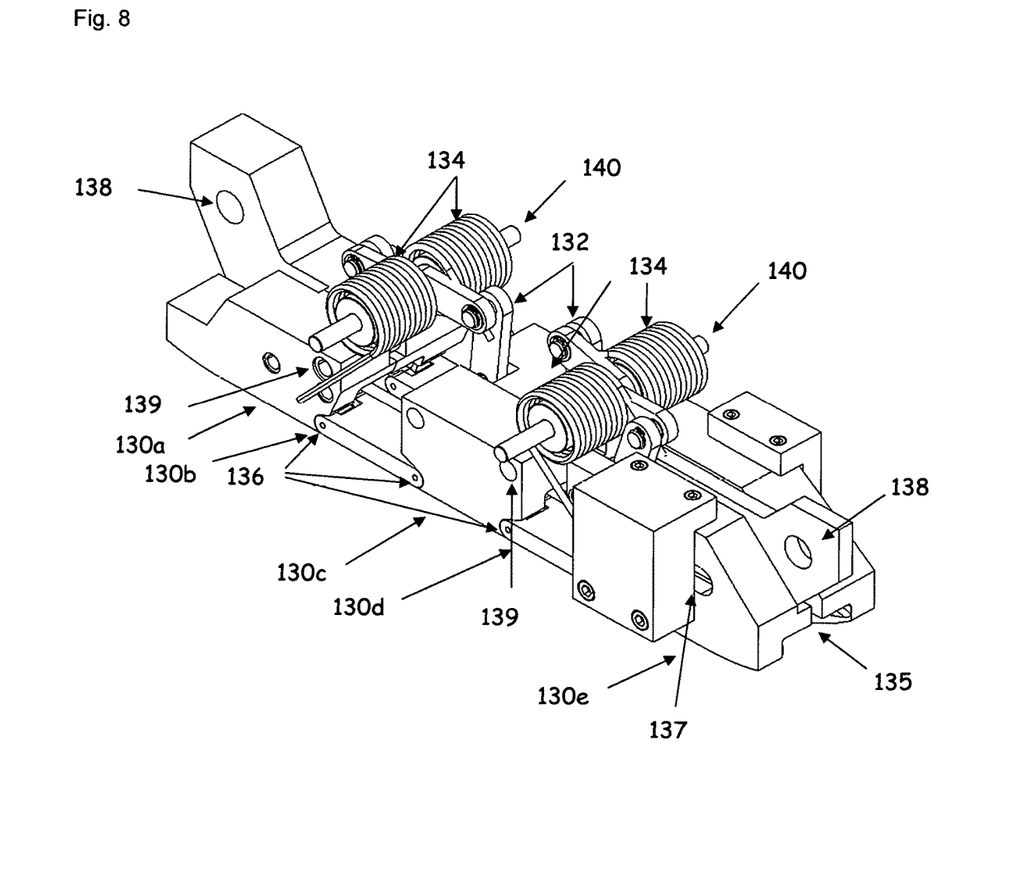
FIG. 8 shows the multi-link suspension apparatus isolated from the track unit.

The multi-link suspension apparatus is shown isolated from the track unit in FIG. 8. The multi-link suspension apparatus consists of suspension links (130a-130e), load force dyads (132) and force distribution elements (134). The suspension links (130) guides the endless track along the slidable connection (135). The suspension links are connected to each other through revolute joints (136) and one or more prismatic joints (137) and connect to the track unit through revolute joints (138). The lateral force dyads (132) are connected to the suspension links (130) with a revolute joint (139) and are connect to the track unit through revolute joints (140). The force distribution elements (134) transfer loads from the endless track through the suspension links (130) to the track unit. Four force distribution elements (134) are shown on the multi-link suspension apparatus in FIG. 7 as rotational springs that create a torque on one link of the lateral force dyad (132) and thus create a tensile force on the suspension links. The multi-link suspension apparatus serves multiple roles; it allows the track to adhere to uneven track surfaces, it distributes the load in a preferred manner over the individual magnetic elements attached to the endless track, and it allows the mobile climbing robotic welding system to operate in horizontal, vertical and inverted orientations.

Figure 9:
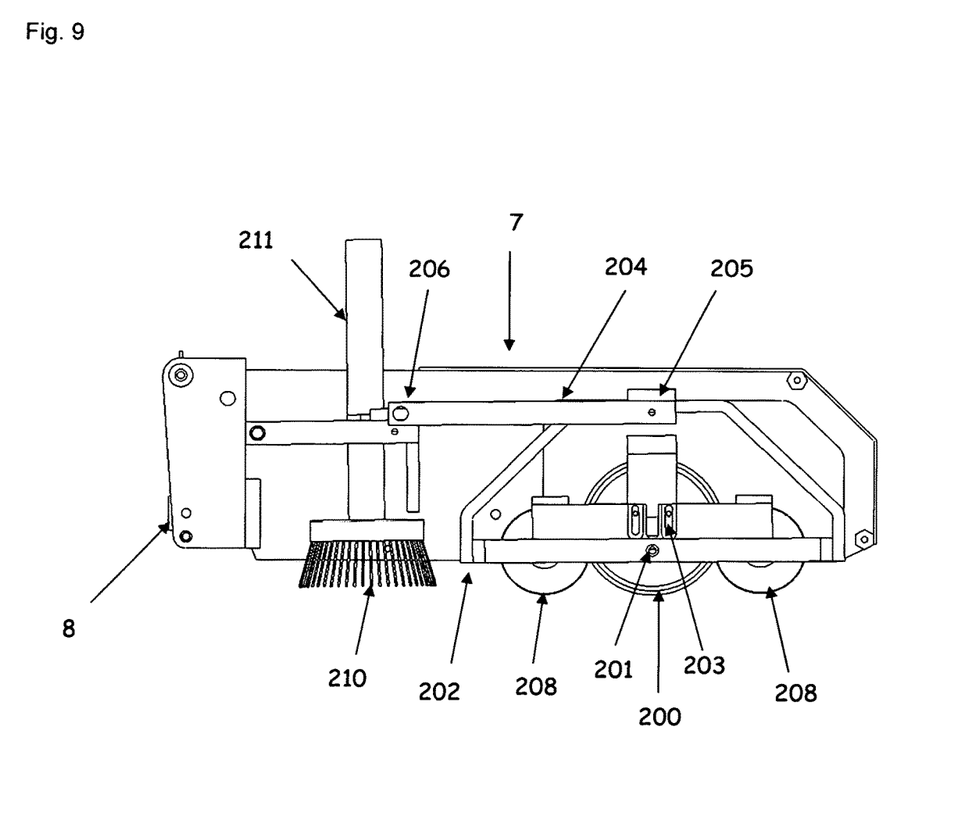
FIG. 9 shows the inspection transducer carriage with side plate removed to show the internal components.

FIG. 9 shows an inspection transducer carriage (7) with side plate removed so that the internal components are exposed. The universal attachment (8) is located at one end to mount with the track unit. The inspection transducer shown here is a wheel type ultrasonic probe (200), connected to an intermediate carriage (202) through revolute joint (201). The probe can be adjusted through slots (203). The intermediate carriage is connected to a floating arm (204) through a universal joint (205) allowing pitch and roll motions of the carriage (202). The floating arm (204) is connected to the inspection transducer carriage (7) with a revolute joint (206) and can be held against the surface through a spring attached to the floating arm and inspection transducer carriage. Guide wheels (208) on the carriage can maintain a consistent position and orientation of the transducer to the climbing surface. A cleaning mechanism for light cleaning can be mounted in the inspection transducer carriage linear actuator and can consist of a brush (210) driven by a rotary actuator (211).

Figure 10:
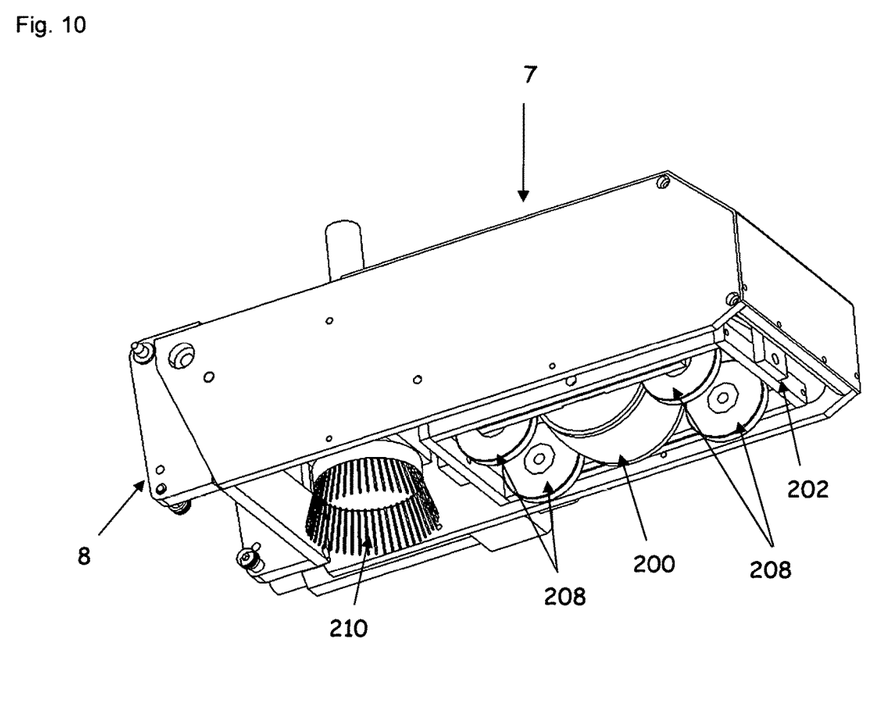
FIG. 10 shows an isometric view of the transducer manipulator.

FIG. 10 shows a second view of the inspection transducer carriage (7) with universal attachment (8), wheel probe (200) mounted in a carriage (202) and oriented to the inspection surface through guide wheels (208). The cleaning brush (210) is shown to operate in line with the wheel probe (200).

Figure 11:
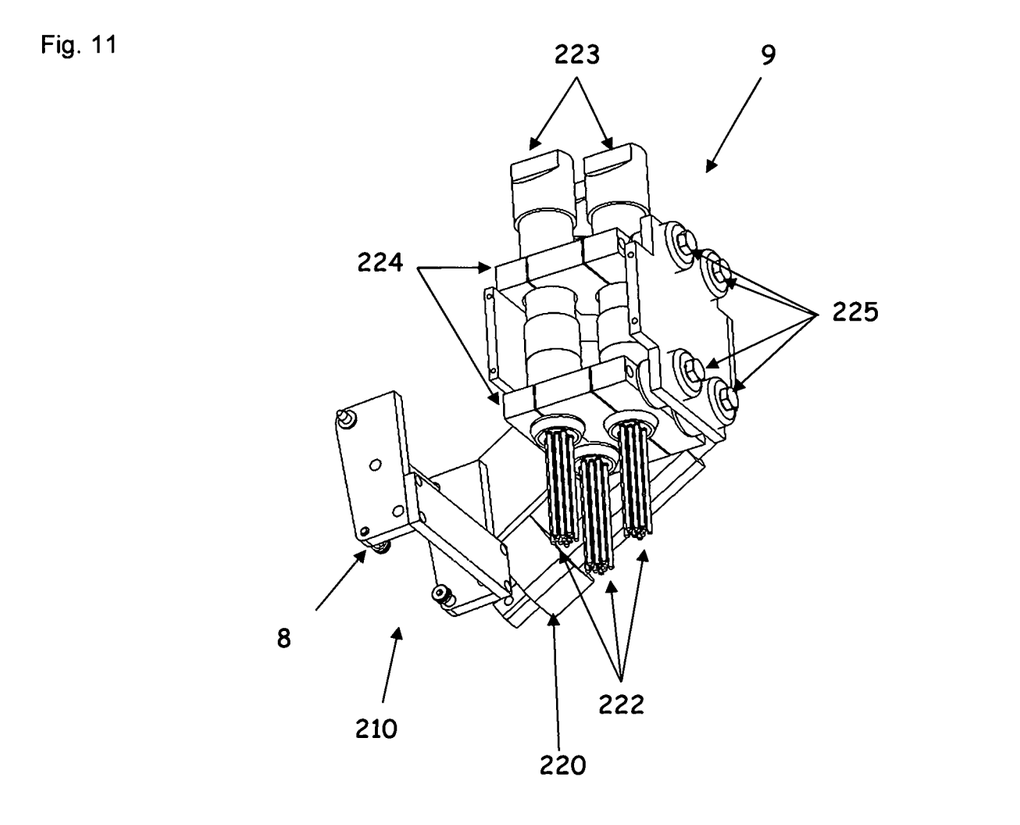
FIG. 11 show the surface cleaning manipulator with side plate removed to show the internal components.

FIG. 11 shows a surface cleaning manipulator (9) with side plate removed so that the internal components are exposed.

The universal attachment (8) is located at one end to mount with the track unit. An actuator (220) can provide lift motion of the surface cleaning manipulator to place it on the climbing surface or lift as desired. The surface cleaning manipulator consists of some type of tooling to prepare the surface for cleaning. FIG. 11 shows a set of three needle scalars (222) driven by actuators (223) mounted in attachment blocks (224) to the surface cleaning manipulator (9) body through rubber isolators (225) to reduce vibration on the surface cleaning manipulator.

Figure 12:
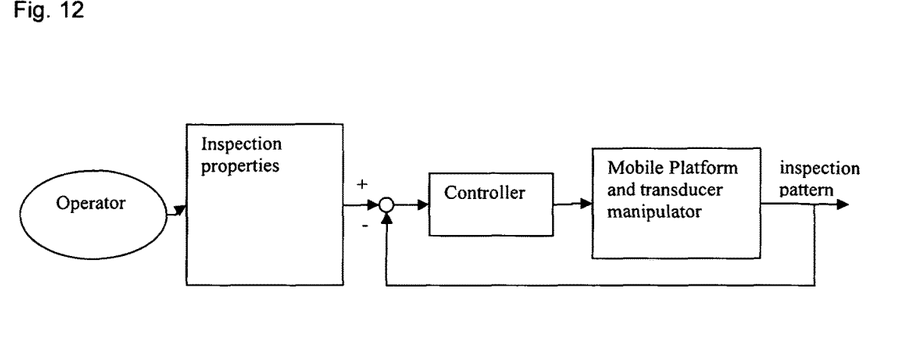
FIG. 12 shows a flow chart for closed loop control on inspection vehicle motion control during operation.

FIG. 12 shows a block diagram that presents the overall control system for the mobile inspection system through remote control by an operator with a control interface. This diagram demonstrates closed loop control of the motions of the actuators contained on the endless track climbing vehicle, inspection transducer carriage and surface cleaning manipulators to follow a desired path defined in terms of forward travel speed, lateral travel motion (position, velocity, dwells at desired).

Figure 13:
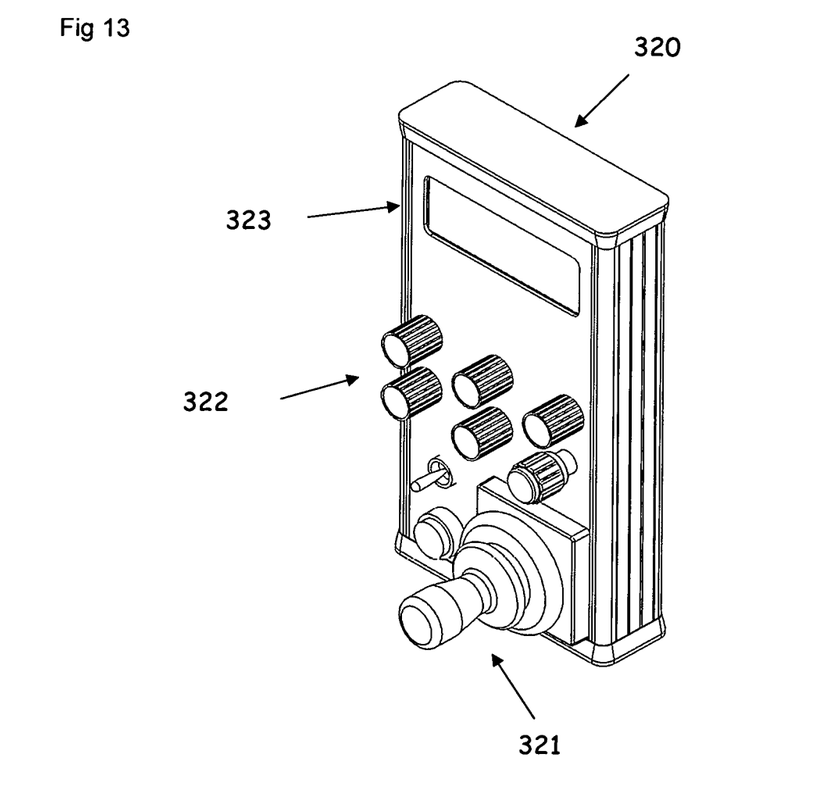
FIG. 13 shows a hand-held controller that is used by an operator to control the endless track vehicle during a remotely operated inspection.

FIG. 13 shows a hand-held controller (320) that is used by an operator to control the endless track vehicle during a remotely operated inspection. The controller includes a joystick (321) for general purpose motions and a series of control input dials (322) for controlling the inspection transducer and cleaning systems. The controller contains a display (323) to present information to the operator in a character and or graphical presentation.

What is claimed is:

1. A climbing endless track vehicle for performing remote inspection on surfaces that is able to operate in all positions including horizontal, vertical and upside down comprising
    a chassis,
    an endless track revolving about the chassis having an interior portion and an exterior portion, with adhering members capable of producing an attracting force with the inspection surface attached to the exterior portion and a protrusion attached to the interior portion of the endless track, a drive mechanism attached to the chassis comprising a drive wheel and drive source, with the drive wheel engaging the interior portion of the endless track for driving the endless track,
    a suspension apparatus comprising suspension links, a force distribution member, and a track tensioning device,
    each suspension link having an adjacent suspension link, each suspension link further having an interior and exterior portion, the link interior portion having a slot, with slot dimensions configured to mate with the protrusion of the endless track in a slidable manner, the suspension link connected to the adjacent suspension link with a revolute joint or prismatic joint with the revolute joint or the prismatic joint positioned to maintain a slidable transition of the track along the suspension links,
    the force distribution member connecting suspension links to the chassis,
    the force distribution member selected to uniformly distribute the forces required for climbing along the endless track and the adhering members,
    an inspection transducer carriage that can support an inspection transducer attached to the inspection transducer carriage with a revolute joint to maintain correct position and alignment of the transducer to the inspection surface while traveling along the inspection surface.

2. The vehicle as in claim 1 in which the inspection transducer carriage contains one or more actuated degrees of freedom to move the inspection transducer about the inspection surface with movements relative to the endless track vehicle.

3. The vehicle as in claim 1 in which a mounting of the inspection transducer within the inspection transducer carriage can be adjusted manually to set the orientation of the inspection transducer relative to the climbing surface.

4. The vehicle as in claim 1 in which the inspection transducer carriage can be attached to different locations on the endless track vehicle using a universal attachment.

5. The vehicle as in claim 1 in which a plurality of the inspection transducer carriages and the inspection transducers may be attached at different locations on the endless track vehicle using a universal attachment.

6. The vehicle as in claim 1 in which the chassis provides one or more degrees of freedom or motions relative to the endless track to allow for a greater adaptation to climbing surface geometries and irregularities.

7. The vehicle in claim 1 in which a sensor is attached to the vehicle and can provide spatial information about the inspection task to a control interface.

8. A climbing endless track vehicle for performing remote inspection on surfaces that is able to operate in all positions including horizontal, vertical and upside down comprising
    a chassis,
    an endless track revolving about the chassis having an interior portion and an exterior portion, with adhering members capable of producing an attracting force with the climbing surface attached to the exterior portion and a protrusion attached to the interior portion of the endless track,
    a drive mechanism attached to the chassis comprising a drive wheel and drive source, with the drive wheel engaging the interior portion of the endless track for driving the endless track,
    a suspension apparatus comprising a plurality of suspension links, a force distribution member, and a track tensioning device,
    each suspension link further having an interior and exterior portion, the link interior portion having a slot, with slot dimensions configured to mate with the protrusion of the endless track in a slidable manner, each suspension link connected to the adjacent suspension link with a revolute joint or prismatic joint with the revolute joint or prismatic joint positioned to maintain a slidable transition of the track along the suspension links,
    the force distribution member connecting suspension links to the chassis,
    the force distribution member selected to uniformly distribute the forces required for climbing along the endless track and the adhering members,
    an inspection transducer carriage that can support an inspection transducer attached to the inspection transducer carriage with a revolute joint to maintain correct position and alignment of the transducer to the inspection surface while traveling along the inspection surface,
    a surface cleaning manipulator that can support tools that can clean and prepare the surface for inspection before or during the inspection process,
    the surface cleaning manipulator connected to the chassis through a revolute joint,
    a communication tether or wireless interface that allows signals to be sent to and from the vehicle, cleaning and inspection equipment to and from an operator located remotely from the inspection task.

9. The vehicle as in claim 8 in which the surface cleaning manipulator with surface cleaning tools can be attached to different locations on the endless track vehicle using a universal attachment.

10. The vehicle as in claim 8 in which the inspection transducer carriage can be attached to the chassis in a modular and reconfigurable arrangement to position the tool in a front or rear position relative to the endless track, to act on a range of manufacturing task configurations.

11. A climbing endless track vehicle for performing remote inspection on surfaces that is able to operate in all positions including horizontal, vertical and upside down comprising
   a chassis,
   an endless track revolving about the chassis having an interior portion and an exterior portion, with adhering members capable of producing an attracting force with the climbing surface attached to the exterior portion and a protrusion attached to the interior portion of the endless track,
   a drive mechanism attached to the chassis comprising a drive wheel and drive source, with the drive wheel engaging the interior portion of the endless track for driving the endless track,
   a suspension apparatus comprising a plurality of suspension links, a force distribution member, and a track tensioning device,
   each suspension link having an adjacent suspension link, each suspension link further having an interior and exterior portion, the link interior portion having a slot, with slot dimensions configured to mate with the protrusion of the endless track in a slidable manner, the suspension link connected to the adjacent suspension link with a revolute joint or a prismatic joint with the revolute joint or prismatic joint positioned to maintain a slidable transition of the track along the suspension links,
   the force distribution member connecting suspension links to the chassis,
   the force distribution member selected to uniformly distribute the forces required for climbing along the endless track and the adhering members,
   an inspection transducer carriage that can support an inspection transducer attached to the inspection transducer carriage with a revolute joint to maintain correct position and alignment of the transducer to the inspection surface while traveling along the inspection surface,
   a surface cleaning manipulator that can support tools that can clean and prepare the surface for inspection before or during the inspection process,
   the surface cleaning manipulator connected to the chassis through a revolute joint,
   a communication tether or wireless interface that allows signals to be sent to and from the vehicle, cleaning and inspection equipment to and from an operator located remotely from the inspection task,
   a control interface that allows control of the motion of the inspection transducer along the climbing surface and actuation of the transducer and cleaning units,
   a sensor is attached to the vehicle and can provide spatial information about the inspection task to the control interface.

12. The vehicle as in claim 11 in which an inspection pattern coming from the climbing endless track vehicle for performing remote inspection is subtracted from an inspection property from an operator and the result is given to a controller to adapt vehicle and inspection transducer carriage motion to maintain an initial setting and adjustment of the transducer motion.

13. The vehicle as in claim 11 in which the inspection transducer carriage can be attached to the chassis in a modular and reconfigurable arrangement to position the tool in a front or rear position relative to the endless track, to act on a range of manufacturing task configurations.

* * * * *